United States Patent
Buddhikot et al.

(10) Patent No.: US 9,553,709 B2
(45) Date of Patent: Jan. 24, 2017

(54) METHOD AND APPARATUS FOR WIRELESS COMMUNICATION USING A SHORT-RANGE BASE STATION WITH MULTIPLE RADIO INTERFACES OF DIFFERENT TECHNOLOGIES

(71) Applicants: Milind M. Buddhikot, Raritan Township, NJ (US); Sayandeep Sen, Madison, WI (US); Dragan Samardzija, Highlands, NJ (US); Tan Zhang, Madison, WI (US); Susan Walker, Freehold, NJ (US)

(72) Inventors: Milind M. Buddhikot, Raritan Township, NJ (US); Sayandeep Sen, Madison, WI (US); Dragan Samardzija, Highlands, NJ (US); Tan Zhang, Madison, WI (US); Susan Walker, Freehold, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 5 days.

(21) Appl. No.: 14/053,201

(22) Filed: Oct. 14, 2013

(65) Prior Publication Data
US 2014/0105134 A1   Apr. 17, 2014

Related U.S. Application Data

(60) Provisional application No. 61/714,257, filed on Oct. 16, 2012.

(51) Int. Cl.
*H04W 16/14* (2009.01)
*H04L 5/00* (2006.01)
(Continued)

(52) U.S. Cl.
CPC ......... *H04L 5/0058* (2013.01); *H04L 27/0006* (2013.01); *H04W 16/14* (2013.01); *H04W 72/00* (2013.01); *H04W 88/10* (2013.01)

(58) Field of Classification Search
None
See application file for complete search history.

(56) References Cited

U.S. PATENT DOCUMENTS

| 2007/0032239 A1 | 2/2007 | Shaheen et al. |
| 2007/0133482 A1 | 6/2007 | Grannan |

(Continued)

FOREIGN PATENT DOCUMENTS

| JP | 2012518927 A | 8/2012 | |
| KR | WO 2012074343 A2 * | 6/2012 | ........... H04L 5/0005 |

(Continued)

OTHER PUBLICATIONS

Reconfigurable Radio Systems (RRS); Use Cases for Operation in White Space Frequency Bands, RRS-01015V116, ETSI Draft pp. 14-18 and 35-45, Sep. 2012.*

(Continued)

*Primary Examiner* — Hassan Phillips
*Assistant Examiner* — Ayanah George
(74) *Attorney, Agent, or Firm* — Harness, Dickey & Pierce, P.L.C.

(57) ABSTRACT

A method and an apparatus is provided for conducting wireless data communications using whitespace and non-whitespace channels. A short-range base station with an interface for whitespace channels and another interface for non-whitespace channels communicates with user equipment outfitted with equivalent interfaces. The short-range base station has a preference for using the interface for the whitespace channels, where the whitespace channels are whitespace spectrum bands that are available during periods when a primary user is not actively utilizing the whitespace. A spectrum server analyzes spectrum occupancy database (Continued)

information and whitespace spectrum sensing measurements to determine lists of available whitespace spectrum bands for use by the short-range base station.

11 Claims, 4 Drawing Sheets

(51) Int. Cl.
  *H04L 27/00* (2006.01)
  *H04W 72/00* (2009.01)
  *H04W 88/10* (2009.01)

(56) References Cited

U.S. PATENT DOCUMENTS

| | | |
|---|---|---|
| 2007/0213046 A1 | 9/2007 | Li et al. |
| 2009/0049159 A1 | 2/2009 | Boscovic et al. |
| 2013/0078924 A1* | 3/2013 | Choudhury .......... H04W 16/14 455/62 |

FOREIGN PATENT DOCUMENTS

| | | |
|---|---|---|
| WO | WO 2010/111150 A2 | 9/2010 |
| WO | WO-2012074343 A2 | 6/2012 |
| WO | WO-2012094429 A1 | 7/2012 |

OTHER PUBLICATIONS

Reconfigurable Radio Systems (RRS); Use Cases for Operation in White Space Frequency Bands, RRS-01015V116, ETSI Draft pp. 12-18 and 35-45 Sep. 2012.*
A.~Ghasemi and E.S. Sousa. Collaborative spectrum sensing for opportunistic access in fading environments. In Proceedings of IEEE DySPAN, 2005.
Duncan Smith and Sameer Singh. Approaches to multisensor data fusion in target tracking: A survey. *IEEE Transactions on Knowledge and Data Engineering*, 18:1696-1710, 2006.
Milind Buddhikot, Irwin Kennedy, Frank Mullany, and Harish Viswanathan, Ultra-Broadband Femtocells via Opportunistic Reuse of Multi-Operator and Multi-Service Spectrum, Bell Labs Technical Journal (BLTJ) Special Issue on 4G Networks, Feb. 2009.
PCAST Report, Dec. 2013.
International Search Report issued in PCT/US2013/065168 dated Mar. 20, 2014.
Reconfigurable Radio Systems (RRS); Use Cases for Operation in White Space Frequency Bands; RRS-01015V116, ETSI Draft pp. 1-65.

\* cited by examiner

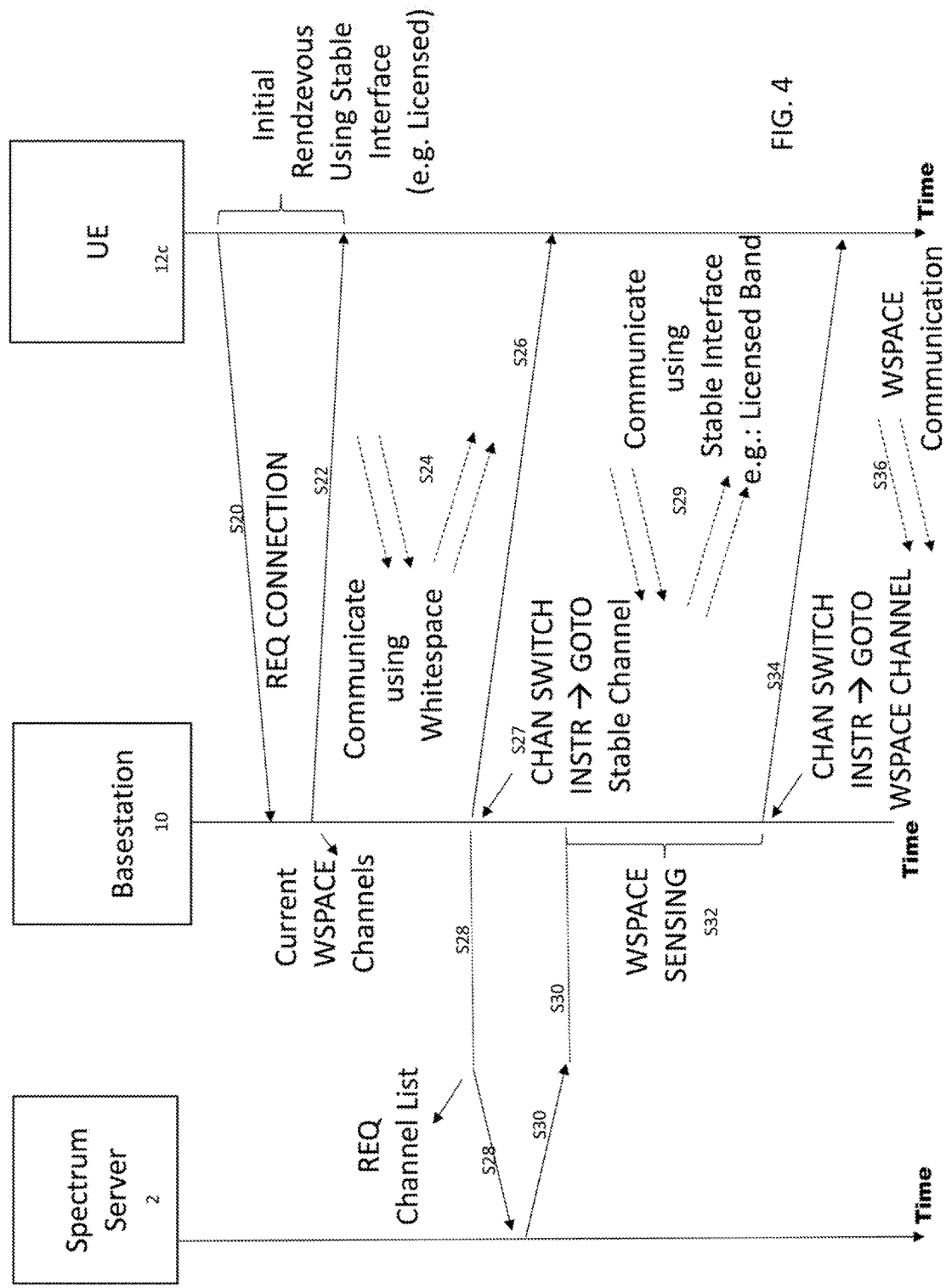

METHOD AND APPARATUS FOR WIRELESS COMMUNICATION USING A SHORT-RANGE BASE STATION WITH MULTIPLE RADIO INTERFACES OF DIFFERENT TECHNOLOGIES

PRIORITY STATEMENT

This application is a non-provisional application that claims priority to U.S. Provisional Application No. 61/714,257, filed on Oct. 16, 2012, the entire contents of which is incorporated by reference in its entirety.

STATEMENT OF GOVERNMENT INTEREST IN THE INVENTION

This application was made with government support under Contract No. CNS 0831762 by the National Science Foundation. The government has certain rights in the invention.

BACKGROUND OF THE INVENTION

Field of the Invention

Example embodiments relate generally to wireless communication, and more particularly to a method and/or apparatus for use of a small, low-power short-range base station equipped with radio interfaces operating at least two complementary technologies. The two technologies may include a technology based on underutilized or unused spectrum called whitespace spectrum (such as TV whitespace spectrum blocks, RADAR spectrum blocks etc.), and a non-whitespace technology (such as the cellular operator's own licensed spectrum technology, or spectrum bands that are entirely unlicensed and available to all users).

Related Art

Spectrum is a scarce resource in wireless communication systems and is considered especially so in wide-area cellular data communication networks. For instance, in the United States, it is anticipated that cellular data traffic volume will reach several exa-bytes per month by 2014 (1 exa-byte=1 million terabytes), roughly equaling the traffic volume of the entire global Internet demand in 2006, putting a stress on the limited available spectrum.

Besides improving the underlying technologies for wireless communication to relieve the strain on spectrum, two popular approaches to address this challenge include: 1) enabling greater spatial re-use through deployment of many low-power, short-range "mini base stations" (sometimes called "small cells" due to their short-range coverage area), such as indoor femto cells, or outdoor micro, pico cells, and 2) perform cellular traffic offloading to unlicensed spectrum bands (such as WiFi access points). However, the use of "mini base stations" using licensed spectrum bands may cause regular interference with existing full-sized base stations deployed outdoors (often called "macro cells"), and the use of conventional unlicensed spectrum bands (such as 2.4 GHz ISM and 5.8 GHz U-NII bands) do not generally offer a reliable source of capacity.

As demand for new spectrum to increase wireless capacity to meet traffic growth increases, new spectrum bands called "whitespace spectrum" are being considered by the regulatory bodies such as the Federal Communication Commission (FCC). An example of such spectrum bands is the DTV whitespace recently made available by FCC guidelines for opportunistic use in specific scenarios. In the United States, TV whitespace often refers to unused portions of TV broadcast spectrum—specifically lower VHF channels 2-6 (54-88 MHz), upper VHF channels 7-13 (174-216 MHz) and UHF channels 14-51 (470-698 MHz) with the exception of channel 37 which is reserved for radio astronomy. Whitespace is allocated to a primary user (such as a digital DTV broadcaster, a public safety agency, a municipality or government, or an organization or a facility-owner with wireless microphones, for instance). While this whitespace spectrum is generally utilized by the primary user to broadcast TV channels, or broadcast sounds (using wireless microphones), some or all of the spectrum may remain unused or under-utilized for varying periods of time. FCC guidelines now allow a secondary user to use this whitespace on a "do-no-harm" basis, as secondary users may use the whitespace assuming their use does not interfere with the primary user. Therefore, wireless communication service providers may utilize the whitespace spectrum as secondary users. In particular, whitespace may be utilized by wireless communication service providers (secondary users) under three scenarios: 1) a whitespace band may be "unlicensed to secondary users," meaning that any secondary user may use the band as a secondary user, 2) a whitespace band may be "exclusively licensed to a secondary user," meaning that only one specifically identified secondary user may use the band as a secondary user, or 3) a whitespace band may be "lightly licensed," meaning that a restricted number of unidentified secondary users, or a small number of specifically identified secondary users, may use the band as a secondary user. To that end, the FCC has mandated that unlicensed devices be able to either detect the presence of TV stations with a received signal strength as low as −114 dBm and wireless microphones with a received signal strength as low as −126 dBm, or have the capability to contact a TV spectrum occupancy database, so the unlicensed user may know to vacate the band if a primary user is detected in order to guarantee the primary user's use of the spectrum.

Other examples of whitespace spectrum are spectrum bands used by United States Federal Government systems (for example, 3550-3700 MHz used by Naval Radars).

SUMMARY OF INVENTION

Example embodiments provide a method and/or an apparatus for use of a low-power short-range base station capable of switching between at least two radio interfaces operating under different technologies and spectrum bands. Specifically, the base station may include an interface providing a whitespace spectrum (such as a TV whitespace spectrum), and another interface using non-whitespace spectrum. The base station may primarily use the whitespace spectrum for data communications, while relying upon non-whitespace spectrum for control signaling and "stop-gap" data communications (when the whitespace spectrum is disrupted, degraded or not immediately available).

At least one example embodiment relates to a method of wireless communication using whitespace channels, including exchanging, at a short-range base station, data communications with a user equipment on a first whitespace channel; determining, at the short-range base station, whether the first whitespace channel will be lost; and switching, at the short-range base station, the data communications to a second whitespace channel if the determining step indicates that the first whitespace channel will be lost, the first and second whitespace channels being channels that are licensed to a primary user and utilized by a wireless communication service provider as a secondary user.

At least another example embodiment relates to a short-range base station, including a first radio interface configured to carry a non-whitespace channel; a second radio interface configured to carry a first whitespace channel; and a processor configured to control the base station to, exchange data communications with a user equipment on the first whitespace channel; determine whether the first whitespace channel will be lost; and switch the data communications to a second whitespace channel if it is determined that the first whitespace channel will be lost, wherein the first and second whitespace channels are channels that are licensed to a primary user and utilized by a wireless communication service provider as secondary user, wherein the non-whitespace channel is a channel that is exclusively licensed to a wireless communication service provider and unlicensed to all users.

At least another example embodiment relates a method of wireless communication using whitespace and non-whitespace channels, comprising: sending, at a user equipment, a connection request to a short-range base station on a non-whitespace channel via a first interface on the user equipment; exchanging, at the user equipment, data communications with the short-range base station on a first whitespace channel via a second interface on the user equipment; receiving, at the user equipment, a switch-channel request from the short-range base station on the non-whitespace channel; and switching, at the user equipment, data communications to a second whitespace channel based on the switch-channel request, wherein the first and second whitespace channels are channels that are licensed to a primary user and utilized by a wireless communication service provider as secondary user, wherein the non-whitespace channel is a channel that is exclusively licensed to a wireless communication service provider and unlicensed to all users.

At least another example embodiment relates to a method of analyzing whitespace spectrum, including, checking, at a spectrum server, a spectrum occupancy database for available whitespace spectrum band information within a whitespace spectrum; generating, at the spectrum server, a list of the available whitespace spectrum bands based on the available whitespace spectrum band information; and transmitting, at the spectrum server, the list of the available whitespace spectrum bands to at least one short-range base station.

BRIEF DESCRIPTION OF THE DRAWINGS

The above and other features and advantages of example embodiments will become more apparent by describing in detail, example embodiments with reference to the attached drawings. The accompanying drawings are intended to depict example embodiments and should not be interpreted to limit the intended scope of the claims. The accompanying drawings are not to be considered as drawn to scale unless explicitly noted.

FIG. 4 is a simplified communication flow diagram of a method of using multiple radio interfaces of different technologies for wireless communication for an end-user, in accordance with an example embodiment.

DETAILED DESCRIPTION

Figure 1:
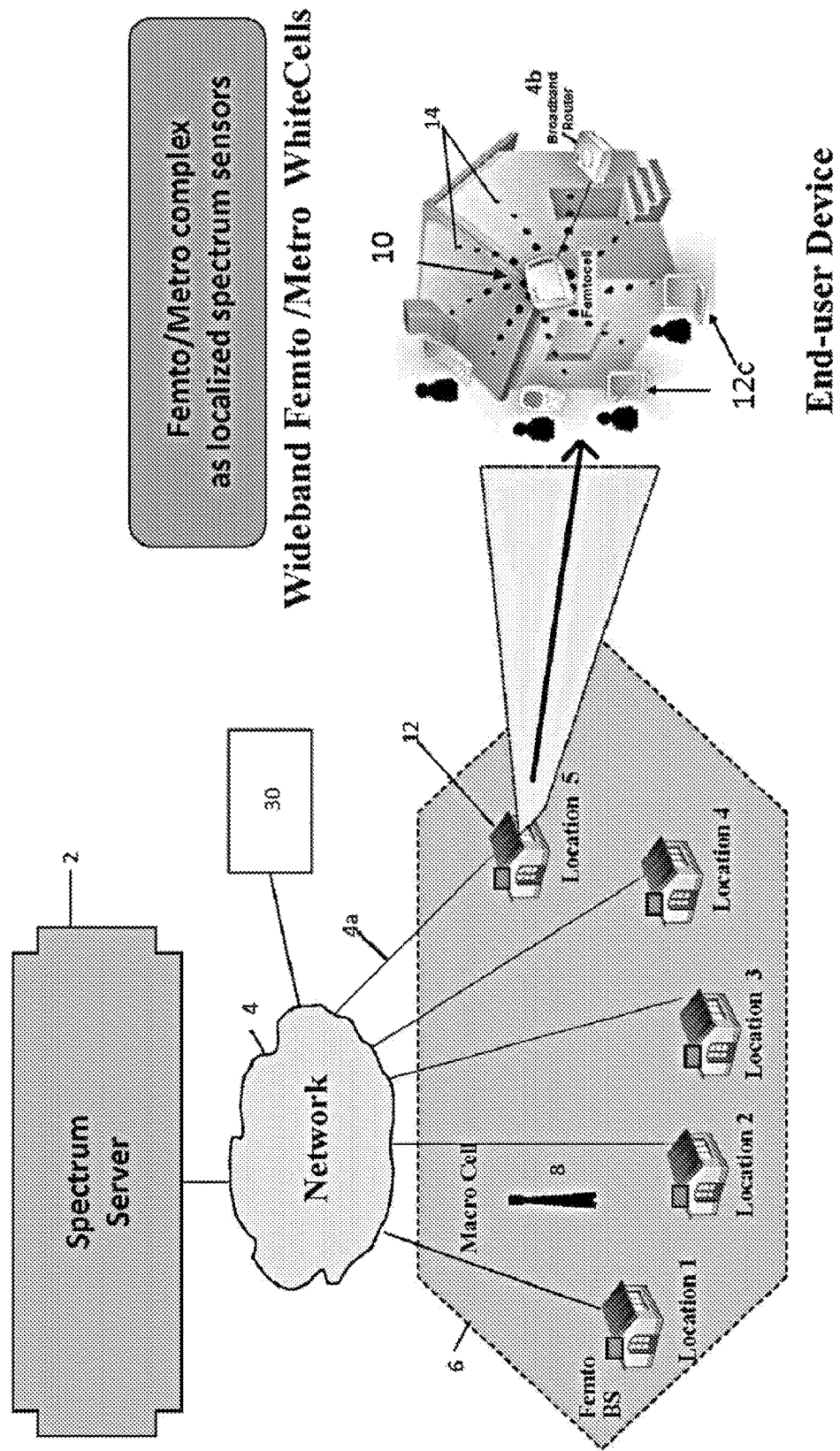
FIG. 1 is an architecture of a system utilizing short-range base stations with multiple radio interfaces of different technologies for wireless communication, in accordance with an example embodiment.

While example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium, such as a non-transitory storage medium. A processor(s) may perform the necessary tasks.

Specific structural and functional details disclosed herein are merely representative for purposes of describing example embodiments. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of program storage medium or implemented over some type of transmission medium. The program storage medium may be any non-transitory storage medium such as magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

FIG. 1 is an architecture of a system utilizing short-range base stations 10 with multiple radio interfaces of different technologies for wireless communication. The system may include small, low-power short-range base stations 10 that provide localized wireless coverage 14 to user-equipment devices 12c that are contained within a cellular provider's wireless coverage area 6. These short-range base stations 10 may be, for instance, femto-cell, metro-cell, pico-cell or micro-cell base stations that have a short-range for indoor or outdoor use. As described herein, the short-range base stations 10 provide two major functions: 1) the base stations 10 act as a sensor taking measurements of wide spectrum bands that cover whitespace spectrum bands, 2) the base stations 10 provide multiple radio interfaces of differing technologies operating in different spectrum bands to user-equipment (UE) 12c within its coverage area 12 (such as an indoor area including a user's home, or outdoor areas of limited size).

At least one of the radio interfaces of the base stations 10 may provide communication channels of non-whitespace channels (which are channels that are either exclusively licensed to a cellular operator, or channels that are unlicensed to all users and available for use by any user). This interface may be considered a "stable interface." The channels of licensed spectrum technology may also be used by a conventional macro-cell 8 that provides the cellular operator's network 4 to a wide coverage area 6. At least another one of the radio interfaces of the base stations 10 may provide communication channels of whitespace spectrum technology (as described in more detail, herein). This interface may be considered a "whitespace interface."

User-equipment (UE) 12c may connect to a short-range base station 10 using a "bonded" wireless link spanning both spectrum blocks and technologies in order to be able to communicate with the short-range base station 10. The base stations 10 maintain backhaul 4a data connectivity to the cellular operator's network 4 via common broadband services that are conventionally available (such as DSL, cable, modem, fiber, etc.), where the base station 10 may for instance connect to the network 4 via an in-home router 4b.

As described herein in more detail, the spectrum server 2 may compile and analyze whitespace spectrum sensing measurements taken from the base stations 10. The spectrum server 2 may also have the capability to access a TV spectrum occupancy database 30 to obtain coarse timescale information about available whitespace channels (also described herein).

Figure 2:
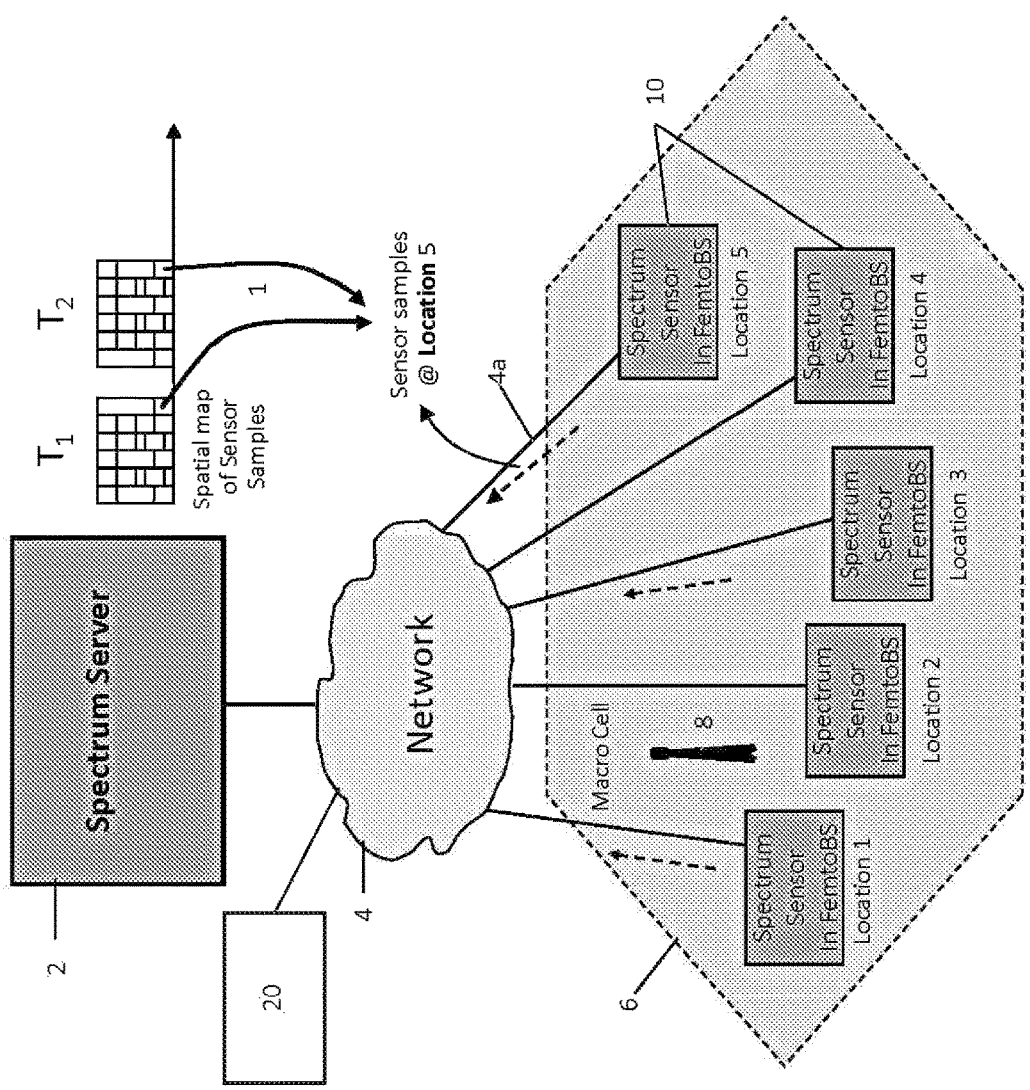
FIG. 2 is a simplified depiction of the system of FIG. 1, where the short-range base stations sense a whitespace spectrum for further processing at the spectrum server, in accordance with an example embodiment.

FIG. 2 is a simplified depiction of the system of FIG. 1, where the short-range base stations 10 sense whitespace spectrum 1 for further processing at the spectrum server 2. In particular, the base stations 10 may each be configured to act as whitespace sensors that measure and map seemingly available whitespace spectrum for further processing at the spectrum server 2 (where the spectrum server 2 may ultimately assign the best-available whitespace spectrum bands to base stations 10, using various criteria). This sensing may be "collaborative," from the standpoint that numbers of base stations 10 within a geographic area may cooperate to identify the presence of primary users and available whitespace, as described herein.

The information derived from the whitespace sensing of the base stations 10 may be in the form of a localized measurement radio environment (LMRE) at various time instances ($T_1$, $T_2$, etc.) that includes snap-shots, over a period of time (and at regular time increments), where this information is then sent through the network backhaul 4a to the spectrum server 2 for actual whitespace assignment. Spectrum server may construct a spatial map of the whitespace spectrum, over a particular geographic region, using the LMRE information.

Figure 3:
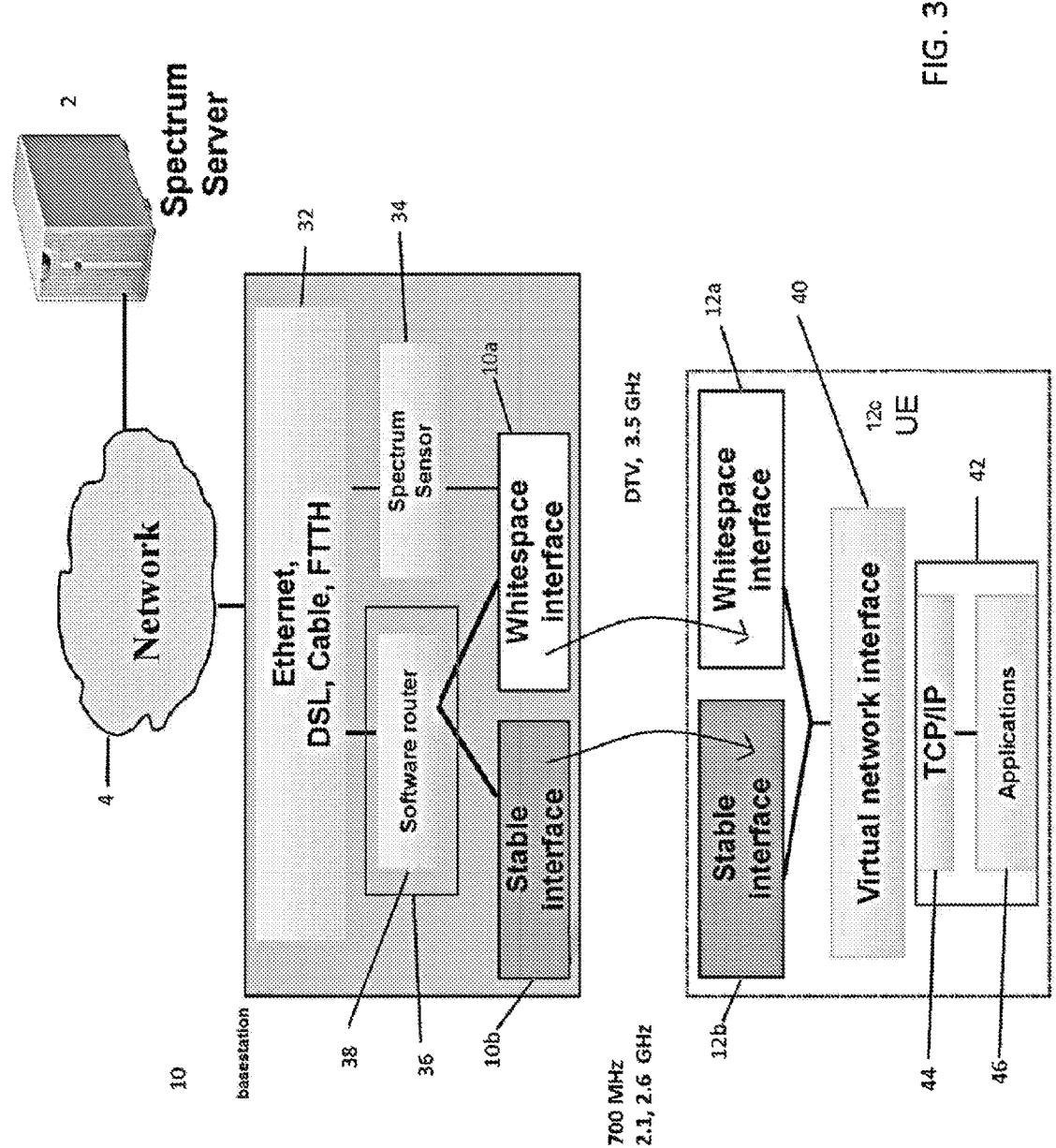
FIG. 3 is a logical organization of the short-range base station of FIG. 1, interfacing with user-equipment, in accordance with an example embodiment.

FIG. 3 is a logical organization of one of the short-range base stations 10 of FIG. 1, interfacing with UE 12c. The base station may include a processor 36 for controlling the base station 10. A software router 38 routes communications between interfaces 10a/b (described below) and a connection 32 that is in communication with the network 4. Spectrum sensor 32 is capable of sensing whitespace spectrum (as described herein).

The base station 10 may interface with a user equipment 12c. The user equipment 12c may include a processor 42 that controls the user equipment 12c. A virtual interface controls routes a flow of communication between interfaces 12a/b (described below) and a TCP/IP layer 44, where the TCP/IP layer 44 communicates with an application layer 46.

The goal of the base station 10 configuration is to maximize use of the "whitespace interface" (using channels of whitespace spectrum technology) 10a. This is because use of this interface may offer larger-capacity data communication demands (as compared to the conventional licensed spectrum channels, which are exclusively licensed to a wireless communication service provider), while also ensuring that the base station does not directly interfere with conventional macro-cells 8 (as shown in FIGS. 1 and 2). However, disadvantages to the use of the whitespace interface 10a include the fact that the whitespace spectrum may be overtaken by a primary user at any time, and shared use of an available whitespace channel (i.e., a channel that is unused by the primary user) by an overpopulation of secondary users may cause the channel to become degraded. Therefore, to combat these unreliable aspects of the whitespace spectrum, the "stable interface" (using non-whitespace channels, which are channels that are not "whitespace" channels) 10b may be utilized as a "stop-gap" communication link, when the whitespace interface 10a is not operational due to a lack of viable/usable whitespace spectrum and an appropriate alternate whitespace channel is searched. The "stable interface" 10b may also be used as a reliable means of sending and receiving control signals to and from the service providers network 4 and spectrum server 2 (while data payload may mainly be transferred via the "whitespace interface" 10a).

Each interface 10a/b of base station 10 is configured to communicate with a respective "whitespace interface" (using whitespace spectrum) 12a and "stable interface" (using a conventional channel that is exclusively licensed to a wireless communication service provider, or a channel that is entirely unlicensed and available to all users) 12b of the UE 12c. The interaction between base station 10 and UE 12c is described in more detail in the discussion of FIG. 4, below.

FIG. 4 is a simplified communication flow diagram of a method of using multiple radio interfaces of different technologies for wireless communication for an end-user. The description of this method provides one succinct example of a UE 12c connecting to a base station, utilizing whitespace assigned by a spectrum server 2, and then searching for and being reassigned additional whitespace, though it should be understood that the actual order of these steps may be interchanged (and variations of the exact implementation of each of these steps may be altered, based upon the detailed discussions and general understanding of the goal of each of these steps, described herein).

In step S20, UE 12c may send a connection request (in the form of a beacon, or a succession of beacons) to base station 10. In step S22, base station 10 may respond by sending a request grant S22 to UE 12c. The request grant S22 may include the identity of a currently available whitespace channel or channels (which may vary in width, generally in bands that are between 5 MHz and 20 MHz) that may be utilized by UE 12c and base station 10. The identity of the currently available whitespace channel or channels (which is included the request grant S22) may have been previously obtained by base station 10 from spectrum server 2, as described in the detailed example below. In step S24, payload data communications may then be freely exchanged between base station 10 and UE 12c until a primary user is detected, as described below. It should be noted that the connection request S20 and request grant S22 (along with all other control signaling) may preferably occur via stable interfaces 10b/12b (FIG. 3). The connection request S20 and request grant S22 may also include authentication information that authenticates UE 12c for use with base station 10.

In step S27, the base station 10 becomes aware that a primary user will imminently be accessing the whitespace channel it is using or the channel is degraded due to excessive secondary devices. This awareness may arise from available channel list information that may periodically be sent from the spectrum server 2 to the base station 10, indicating the imminent return of the primary user or change in ranking of spectrum channel due to increased secondary user activity. In these cases, the base station 10 may actively disconnect the whitespace channel from UE 12c and work with spectrum server 2 to locate another whitespace channel. Because finding an efficient alternative whitespace channel may potentially take on order of tens of seconds (sometimes 60-120 seconds, depending on interference parameters and the availability of whitespace bands especially in highly-populated areas where whitespace is a premium), base station 10 switches to the stable interface 10b during this search for a new whitespace band, as described herein. Switching to the stable interface 10b also affords the base station 10 and/or spectrum server 2 more time to thoroughly measure and identify a new whitespace band.

Following step S27, base station 10 may send a switch-channel message S26 to UE 12c to instruct UE 12c to switch to the stable interface 12b in order to rely upon non-whitespace channels for future data communications until another whitespace channel may be obtained (which may take as many as 60-120 seconds during periods of high interference, for instance). Therefore, in step S29, the base station 10 and UE 12c continue uninterrupted payload data communications, though this communication in step S29 now occurs over a non-whitespace channel (which may be considered a "stop-gap" communication link, during a period when the base station 10 searches for a new whitespace band). In the event that the UE 12c does not receive the switch-channel message S26, the base station 10 disconnects the UE 12c in which case the UE 12c automatically resorts to using the stable interface 12b to reconnect to the base station.

Following step S27, base station 10 also sends an available whitespace channel list request S28 to spectrum server 2 (which may be sent at approximately the same time as the switch-channel message S26). The available whitespace channel list request S28 is received by spectrum server 2, whereupon spectrum server 2 transmits an available whitespace channel list S30 to base station 10 based upon information the spectrum server 2 is in possession of at the time. This available whitespace channel list S30 may be in the form of an actual whitespace channel assignment (providing base station 10 with the identity of a whitespace channel that may be used by UE 12c). Or, the available whitespace channel list S30 may be in the form of an actual listing of possible whitespace channels that may be further probed by the base station 10.

If spectrum server 2 provides a listing of available whitespace channels S30 (rather than the identity of one lone whitespace channel for UE 12c use), base station 10 may undergo whitespace sensing (in step S32). This whitespace sensing S32 may involve sensing one or more whitespace channel bands, based upon a restricted list of whitespace channels (which may be provided via the available whitespace channel list S30). Optionally, but not preferably, base station 10 may simply search all known whitespace spectrum (independently of any input from spectrum server 2) during the whitespace sensing S32 (in which case the available whitespace channel list request S28 and available whitespace channel list S30 need not be exchanged between base station 10 and spectrum server 2).

In step S34, base station 10 sends a switch-to-whitespace message to UE 12c, with the identity of an available whitespace band that is to be utilized in future data communications. Therefore, in step S36, the base station 10 and UE 12c continue uninterrupted payload data communications, though this communication in step S36 now occurs over a new whitespace channel.

Spectrum Sensing

It should be understood that spectrum sensing (performed in step S32 of FIG. 4) is not a required step of the FIG. 4 embodiment. Because spectrum server 2 may access a publicly available TV spectrum occupancy database (mandated by the FCC), spectrum server 2 may obtain information on available whitespace spectrum without relying on spectrum sensing. However, the TV spectrum occupancy database is based on (1) computations that use propagation models and (2) information available on a coarse timescale (where spectrum availability is collected and reported using information that is updated every few hours, or updated as infrequently as every 48 hours) pertaining to primary users (i.e. TV and microphone transmitters). Therefore, the TV spectrum occupancy database is not entirely accurate at measuring available whitespace. Additionally, the TV spectrum occupancy database does not account for any secondary user use of whitespace bands. Therefore, even if the TV spectrum occupancy database indicates available bands of whitespace, these bands may have already become overpopulated by secondary users prior to or during the time that base station 10 accesses these available bands. For these reasons, spectrum sensing (conducted by base station 10 and described in step S32 above) provides valuable real-time data on available whitespace bands that also accounts for secondary user use of the bands. It should also be understood that the embodiment of FIG. 4 may rely solely on spectrum sensing (as described in step S32), without the spectrum server 2 obtaining any information from the TV spectrum occupancy database. Also, the spectrum server 2 may use both the TV spectrum occupancy database information (as spectrum server 2 may obtain this information to narrow the list of potential whitespace channel bands based upon the coarse timescale information included in the database) and spectrum sensing (so that base station 10 may obtain more accurate, real-time data that also accounts for secondary user use of whitespace bands).

The spectrum sensing information collected by the base station can include a multitude of measurements such as (a) energy spectrograms, (b) cyclostationary spectrogram features, (c) local estimates of channel availability (e.g.: coded in form of 0 (available), 1 (occupied), fraction "f" (probability of occupancy)).

While embodiments may rely on both the TV spectrum occupancy database information and spectrum sensing, embodiments may also have the spectrum server 2 and base station 10 obtain this information at regular intervals of time (both before and during the base stations 10 use of the whitespace interface 10a). Embodiments may also exchange this information between the spectrum server 2 and base station 10 on a regular basis. This is to ensure that the base station 10 possesses the most accurate information on available whitespace at any period of time. A benefit of conducting these regular exchanges of information includes the base station 10 being prepared for a connection request S20 (see FIG. 4) by a new UE 12c at any time, thus ensuring that base station 10 may immediately respond to the connection request S20 by sending a request grant S22 with the identity of an available whitespace channel (as the alternative to sending a request grant S22 for a whitespace channel would be to send a grant that begins data communication only on the stable interface 10b, which is not preferable). Another benefit of conducting these regular exchanges of information includes reducing time period in which the base station 10 and spectrum server 2 may react to the loss of an initial whitespace band (in the event a primary user returns to the band), thus reducing a time that would otherwise be required to conduct steps S28, S30 and S32 (FIG. 4). These benefits of the spectrum server 2 regularly accessing the TV spectrum occupancy database and the base station 10 regularly conducting spectrum sensing (with spectrum server 2 and base station 10 regularly sharing this information) may of course be weighed against power usage requirements associated with obtaining this information in order to arrive at a balance between power usage and the benefits of possessing accurate, real-time information on whitespace availability.

Sensing of the whitespace spectrum may be accomplished during periods when the base station 10 is idle or not transmitting on the whitespace interface 10a. If sensing is accomplished collaboratively (with the help of other base stations 10), the sensing may be performed by two or more base stations 10 transmitting simultaneously on a same whitespace channel and measuring a fractional increase in error rate due to a particular user in order to estimate channel quality. Using such a pairwise error, the spectrum server 2 may incrementally build a conflict graph to determine a degree of interference from various base stations 10 from the perspective of one particular base station 10. This allows spectrum server 2 to suggest multiple candidate channels with an expected quality for a particular base station 10 (while accounting for the particular base stations own geographic area and transmit power for a given instance in time), such that the particular base station 10 may then focus on these candidate channels in order to conduct more in-depth whitespace sensing. If sensing is accomplished individually (i.e., through the investigation of a single base station 10 operating independently of other base stations 10), the sensing may also be accomplished by transmitting on a particular whitespace channel to measure parameters such as packet error rates on the particular whitespace channel.

A frequency of collecting measurements (with spectrum server 2 collecting TV spectrum occupancy database information and analyzing spectrum sensing information from base station 10) may also be customized based on properties of primary users. For example, TV station broadcasts can for all practical purposes be assumed to always be present. Meanwhile, wireless microphones (another source of whitespace spectrum) may generally be expected to be transient. Therefore, machine learning techniques (which may be incorporated into spectrum server 2 or base station 10, for instance) may learn the operational patterns of primary users to tailor the frequency of running whitespace spectrum detection.

Channel Selection

The actual selection of a whitespace channel for use (which may be accomplished via the spectrum server 2 making the selection, or the base station 10 making the selection) may rely on any appropriate method. Three example methods are described below.

Random Selection

The base station 10 and/or spectrum server 2 may pick a random set of whitespace channels, conduct measurements and select the best channel among the random set.

History-Based Selection

The base station 10 and/or spectrum server 2 may pick a set of recently observed good channels, and conduct new measurements to pick the best channel from among this list.
Coordinated Selection The spectrum server 2 may specify an initial set of candidate channels and the base station 10 then may measure to select the best channel among these choices that may offer the least interference.

Alternative Embodiments

Alternative to the base station 10 becoming aware that a primary user will imminently be accessing the whitespace band currently utilized by UE 12*c* (step S27 of FIG. 4), the base station 10 may simply become aware that the whitespace band being used by base station 10 has failed or is failing (due to interference, a dip in quality of the channel below a threshold quality level, or for other unknown reasons). In response to such an event, the method of FIG. 4 may still proceed by having base station 10 send a switch-channel message S26 to UE 12*c* and an available whitespace channel list request S28 to spectrum server 2, thereby prompting UE 12*c* to switch to the stable interface 12*b* and prompting spectrum server 2 and base station 10 to seek a new whitespace band.

It should also be understood that whitespace sensing (conducted in step S32 of FIG. 4) by base station 10 may include the base station 10 regularly seeking channel error input information from UE 12*c* (in the event that UE 12*c* is actively using the whitespace channel of interest) as well as other sensing measurements such as energy spectrograms. Or, base station 10 may collaborate with other base stations 10 (that may also be interfacing with other UEs 12*c*) to obtain whitespace channel information on channels of interest. Likewise, spectrum server 2 may collaborate with other spectrum servers 2 or other base stations 10 in order to obtain accurate real-time information on whitespace channels that may be used to then reduce a list of viable whitespace channels for further investigation and analysis prior to sending the available whitespace channel list (step S30 of FIG. 4) to base station 10. Both the spectrum server 2 and base station 10 may also rely upon past channel information data in order to maintain and/or update future lists of viable whitespace channels.

The embodiment of FIG. 4 was also described (above) via a working example involving a single spectrum server 2, a single base station 10, and a single UE 12*c*. However, example embodiments are not limited to this configuration, as a system may involve a plurality of each of these three elements. In embodiments with multiple UEs 12*c* being served by a base station 10, a loss of a whitespace channel (due to the return of a primary user, or for other channel quality reasons) may be handled by the base station 10 only switching a single UE 12*c* (that is using the lost whitespace channel) to the stable interface 12*b* (as shown in step S27). Or, alternatively, the base station 10 may instead switch some or all UEs 12*c* to the stable interface 12*b* (even those UEs 12*c* that are not currently experiencing whitespace channel issues). It should also be understood that a UE 12*c* (rather than base station 10) may first detect a drop in whitespace channel quality, in which case the UE 12*c* may send a whitespace channel quality error message to the base station. This would then prompt the base station 10 to become aware that the base station 10 should switch to stable interface 10*b* (i.e., the whitespace channel quality error message would precede step S27 of FIG. 4).

WiFi

In the absence of a macro-cell base station 8 (FIGS. 1 and 2) using a licensed channel, or in addition to use of a macro-cell (such that at least three radio interfaces may be used), WiFi radio channels may be used as a stable interface (or, as a second option for a stable interface).

Both Interfaces May be Used Simultaneously

Alternatively to the method described by FIG. 4, both interfaces (the stable interface 10*b* and whitespace interface 10*a*) may be used simultaneously to carry payload data communications to UE 12*c*, as opposed to the interfaces each trading off this task. Likewise, both interfaces may be used simultaneously to carry control signaling messages.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:
1. A method of wireless communication using whitespace channels, comprising:
    exchanging, at a base station, data communications with a user equipment on a first whitespace channel;
    determining, at the base station, whether the first whitespace channel will be lost;

switching, at the base station, the data communications to a second whitespace channel if the determining step indicates that the first whitespace channel will be lost, the first and second whitespace channels being channels that are licensed to a primary user and utilized by a wireless communication service provider operating the base station as a secondary user; and exchanging control signaling with the user equipment on the non-whitespace channel even during periods when the base station is exchanging the data communications with the user equipment on one of the first and second whitespace channels, wherein the non-whitespace channel is a channel that is exclusively licensed to a wireless communication service provider and unlicensed to all other users.

2. The method of claim 1, wherein the switching to a second whitespace channel includes, determining if a new whitespace channel is available, if a new whitespace channel is available, assigning the new whitespace channel to be the second whitespace channel, if a new whitespace channel is not available, switching to a non-whitespace channel and searching for an available new whitespace channel, the non-whitespace channel being a channel that is one of exclusively licensed to the wireless communication service provider and unlicensed to all users.

3. The method of claim 2, wherein the searching for a new whitespace channel includes, obtaining a list of one or more available whitespace spectrum bands from a spectrum server, sensing the available whitespace spectrum bands to obtain characteristics of the available whitespace spectrum bands, and selecting one of the available whitespace spectrum bands as the second whitespace channel based upon the obtained characteristics of the available whitespace spectrum bands.

4. The method of claim 2, wherein the searching for a new whitespace channel includes, sensing whitespace spectrum to obtain a localized measurement radio environment (LMRE) of available whitespace spectrum bands, transmitting the LMRE to a spectrum server, and receiving an assignment of the second whitespace channel from the spectrum server.

5. The method of claim 1, wherein the determining whether the first whitespace channel will be lost includes, determining whether the first whitespace channel is one of degraded, interrupted, or the primary user will be returning to the first unlicensed channel.

6. A base station, comprising:

a first radio interface configured to carry a non-whitespace channel;

a second radio interface configured to carry a first whitespace channel; and a processor configured to control the base station to, exchange data communications with a user equipment on the first whitespace channel;

determine whether the first whitespace channel will be lost; and switch the data communications to a second whitespace channel if it is determined that the first whitespace channel will be lost, exchange control signaling with the user equipment on the non-whitespace channel even during periods when the base station is exchanging the data communications with the user equipment on one of the first and second whitespace channels, wherein the first and second whitespace channels are channels that are licensed to a primary user and utilized by a wireless communication service provider operating the base station as a secondary user, wherein the non-whitespace channel is a channel that is exclusively licensed to a wireless communication service provider and unlicensed to all other users.

7. The base station of claim 6, wherein if it is determined that the first whitespace channel is to be lost, the processor is further configured to, determine if a new whitespace channel is available, if a new whitespace channel is available, assign the new whitespace channel to be the second whitespace channel, if a new whitespace channel is not available, switch to the non-whitespace channel and search for a new whitespace channel.

8. The base station of claim 7, wherein the processor is further configured to, obtain a list of one or more available whitespace spectrum bands from a spectrum server, sense the available whitespace spectrum bands to obtain characteristics of the available whitespace spectrum bands, select one of the available whitespace spectrum bands as the second whitespace channel based upon the obtained characteristics of the available whitespace spectrum bands, exchange data communications with the user equipment on the second whitespace channel.

9. The base station of claim 7, wherein the processor is further configured to, sense whitespace spectrum to obtain a localized measurement radio environment (LMRE) of available whitespace spectrum bands, transmit the LMRE to a spectrum server along with base station location and transmit power information, receive an assignment of the second whitespace channel from spectrum server, exchange data communications with the user equipment on the second whitespace channel.

10. The base station of claim 6, wherein the processor is further configured to, switch the data communications to the second whitespace channel if the processor determines that the first whitespace channel is one of degraded, interrupted, or a primary user will be returning to the first unlicensed channel.

11. A method of wireless communication using whitespace and non-whitespace channels, comprising:

sending, at a user equipment, a connection request to a base station on a non-whitespace channel via a first interface on the user equipment;

exchanging, at the user equipment, data communications with the base station on a first whitespace channel via a second interface on the user equipment;

receiving, at the user equipment, a switch-channel request from the base station on the non-whitespace channel;

switching, at the user equipment, data communications to a second whitespace channel based on the switch-channel request; and exchanging, at the user equipment, control signaling with the base station on the non-whitespace channel even during periods when the base station is exchanging the data communications with the base station on one of the first and second whitespace channels, wherein the first and second whitespace channels are channels that are licensed to a primary user and utilized by a wireless communication service provider operating the base station as a secondary user, wherein the non-whitespace channel is a channel that is exclusively licensed to a wireless communication service provider and unlicensed to all other users.

* * * * *